UNITED STATES PATENT OFFICE.

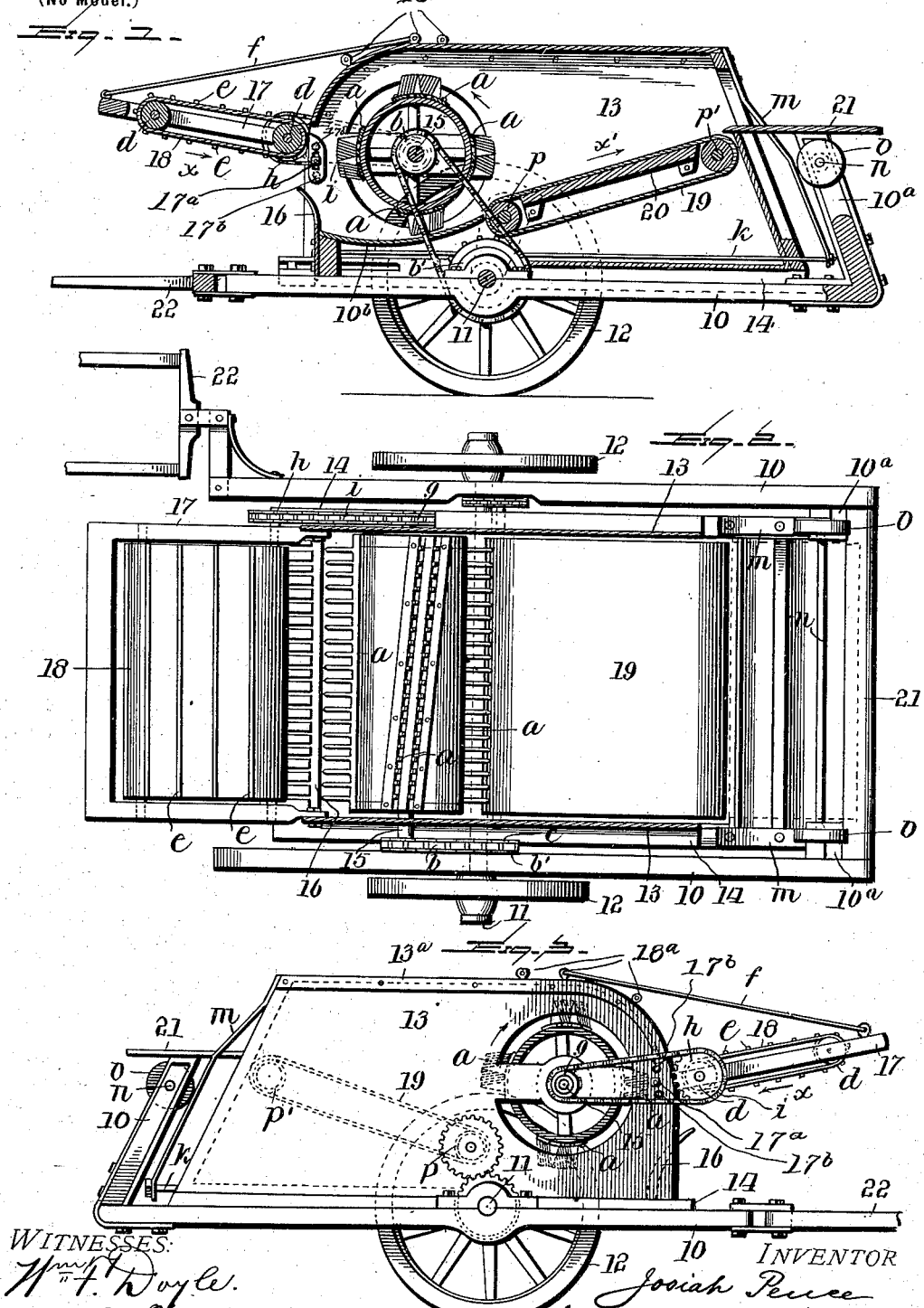

JOSIAH PENCE, OF NICHOLASVILLE, KENTUCKY.

SEED-GATHERER.

SPECIFICATION forming part of Letters Patent No. 709,036, dated September 16, 1902.

Application filed October 30, 1901. Serial No. 80,534. (No model.)

*To all whom it may concern:*

Be it known that I, JOSIAH PENCE, a citizen of the United States, residing at Nicholasville, in the county of Jessamine and State of Kentucky, have invented certain new and useful Improvements in Seed-Gatherers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to clover-harvesters or similar implements employed for gathering seed from stalks standing in the field, and has for its object to provide a seed-harvester of novel simple construction, which will be very effective in service and be adapted to strip seed-bolls from timothy, clover, or other grasses or any cereal that grows in heads on upright stalks.

A further object of the invention is to provide an implement of the class described with an adjustable frame and apron to assist and enforce engagement of the heads of the grass or grain with the stripping-comb.

A further object is the employment of a rotating toothed cylinder in conjunction with the stripping-comb for the purpose of the implement, the comb having adjustment relative to the cylinder, according to the nature of the grass or grain being harvested.

A further object is attained by the employment of a tilting spring-supported frame carrying the comb and cylinder, whereby these parts will temporarily yield to a heavy mass or bunch of grass and avoid choking of said parts.

With these and other objects in view the invention consists in the construction and combination of parts, as is hereinafter described, and defined in the claims.

Reference is to be had to the accompanying drawings, forming a part of this specification, in which similar characters of reference indicate corresponding parts in all the figures.

Figure 1 is a side view of the device, having one side wall of the body removed to expose interior parts shown in section. Fig. 2 is a plan view of the same with the cover of the body removed; and Fig. 3 is a side view of the machine, taken oppositely from that represented in Fig. 1.

The main frame 10 of the implement is supported near its longitudinal center by a transverse axle 11 and two wheels 12 on the ends of said axle. There is a body 13 mounted on the main frame 10 by a rockable engagement of its bottom frame 14 with the axle 11, said frame being positioned within the main frame. The side walls of the body 13 may be of plate metal erected on the bottom frame 14, and a top plate 13ᵃ of like material is preferably secured thereon in a removable manner. Transversely in the body of the machine a stripping-cylinder is held to rotate by a journaled engagement of the center shaft 15 therefor with the side walls 13 of said body. The stripping-cylinder is provided with a suitable number of double-toothed bars $a$, that may to advantage be bent so as to give them a diagonal trend on the body of the cylinder, said toothed bars being of sufficient length to extend from end to end of the cylinder.

The teeth on the bars $a$ are suitably spaced apart and the side edges of the teeth may be somewhat sharpened on corners to adapt them to remove the heads of seed-plants that are operated upon by the machine.

The center shaft 15 extends at each side of the machine-body, and on one extension thereof a sprocket-gear $b$ is secured in the same vertical plane with a larger sprocket-gear $b'$, that is fixed upon the axle 11, these gears being connected with a sprocket-chain $c$.

At a point forward of and near to the stripping-cylinder a stripping-comb 16 is secured transversely on a bar that is held to slide to the front portion of the bottom frame 14, the teeth of the comb being curved forwardly near the points, as clearly shown in Fig. 1. Above the comb 16, on a frame 17, that is held to rock on the side walls 13 of the machine-body, an endless apron 18 is mounted, said apron, of pliable fabric, being held in place by the pair of rollers $d$, that are journaled in the frame 17 near its ends. The endless apron 18 is rendered taut by a proper adjustment of the rollers $d$, and on its outer surface spaced ribs $e$ project and are transversely disposed. The apron-frame 17 may be adjusted toward or from the comb 16 by moving its pivot-bolts 17ª so as to locate them in any pair of peforations 17ᵇ in the walls 13 that will give the desired position to said frame and apron on it. The apron 18 is also adapted for changing its degree of inclination with regard to the comb 16 by an adjustment of the stretcher-bar f, which is loosely engaged at one end with a staple or ring-eye on the outer end of the frame 17 and at the opposite end with one of the series of staples or eyebolts 18ª on the upper side 13ª of the machine-body. The endless apron 18 is moved toward the comb 16 on the lower side of said apron, as indicated by the arrow x in Figs. 1 and 3, by means of sprocket-gears g h and a chain i, that connect one roller d, that carries the apron, with a projecting end of the shaft 15. The cross-bar whereon the comb 16 is fixed is preferably engaged loosely by its ends with longitudinal grooves in side timbers of the frame 14, as indicated in Fig. 1, and from said cross-bar two connecting-rods k extend rearwardly through the body of the machine. On the two rear posts of the body-frame, which may with advantage be upwardly and forwardly inclined, like spring-plates m are affixed by their upper ends, the resilient bodies of said plates being bent rearwardly and downwardly from their upper portions, and near the lower extremities of said spring-plates perforations are formed therein to admit the ends of the connecting-rods k, one of said rods being shown in Fig. 1.

Two stanchions 10ª are erected at the rear end of the main frame 10, these posts being at the sides of the frame, and in the stanchions a transverse shaft n is journaled, whereon two rollers o are mounted and secured. The rollers o are located opposite the spring-plates m and have bearing thereon, and it will be seen that if the bottom frame 14 from any cause is rocked down at the forward end, so as to depress the comb 16 below its normal position, the force of the plate-springs m will tend to return the bottom frame to a level position, and the same return movement will be effected thereby in case the comb 16 is moved forward and then released from abnormal strain.

Within the machine-body at the rear side of the stripping-cylinder an endless apron 19 is supported upon the transverse rollers p p', which are journaled in the sides 13 of the machine-body. The apron 19 inclines upwardly and rearwardly and at the forward end is adjacent to the circular path of the stripping-teeth on the bars a, and between this end of the apron and the comb 16 a bottom plate 10ᵇ is preferably placed, and this may with advantage be rendered concave on the upper side that is near the path of the teeth on the bars a. A rigid table 20 is located beneath the upper ply of the endless apron 19 and serves to sustain said portion of the apron when it is carrying a load. The apron 19 is driven in the direction of arrow x' in Fig. 1 by gearing that is actuated by the axle 11. There may be sprocket-gearing employed to move the apron 19 or meshing toothed gearing, as respectively shown in Figs. 1 and 3. There may be a receiving-table 21 placed at the rear end of the machine to take away material that traverses rearward on the apron 19, and said table may be a medium for transfer of such material to a threshing-machine or into any other receptacle, as may be preferred. At the forward end of the main frame 10 shafts 22, or, if preferred, a tongue may be secured for the attachment of one or more draft-animals to the machine.

The operation is as follows: The machine is drawn through standing grass or grain in the field, and the heads of the grass or grain will first engage between the teeth of the comb 16, the ribs on the apron 18 enforcing such an engagement of the grass-stalks or grain-straw. If the seeds of grass are to be gathered, which is the preferred use for the implement, it is evident that the forward movement of the machine in the field of standing clover, timothy, or other grass will cause the comb 16 to strip the heads or bolls containing the seed from the grass-stalks. Furthermore, in case there is a heavy crop of grass-stalks such standing stalks will be first engaged by the comb 16, and the seed heads or bolls will be stripped from the stalks by the rapidly-rotating toothed bars a on the stripping-cylinder. The heads containing seed will be swept rearward over the bottom plate 10ᵇ and onto the apron 19, which in turn will transfer the seed-bolls to the rear of the machine, to be disposed of as may be found convenient. Any loose seed will, if not carried completely rearward by the apron 19, be caught in the bottom of the machine-body, from which the loose seed may be removed at a suitable time. It will be seen that as the cross-bar which carries the upright comb is spring-supported and also the bottom frame 14, whereon said bar is adapted to slide toward and from the apron 18 and teeth of the stripping-cylinder, there will be such a yielding action afforded to the comb as will avoid choking of the working parts by the introduction of a bulk of grass-stalks, which may temporarily depress the comb; but the latter will be relieved of this obstruction as soon as the heads of the grass are removed from the stalks, which will permit the frame 14 to again assume a level position. It is contemplated to provide an auxiliary attachment for threshing and cleaning seed or grain gathered in the grass or grain heads or to provide means for attaching the implements to a harvester; but as this is not a portion of the present invention it is not shown and need not receive further description in this specification.

Having described the invention, what I claim as new, and desire to secure by Letters Patent, is—

1. A seed-gatherer, comprising a movable main frame, a spring-controlled rockable body thereon, a rotatable stripping-cylinder in the body, and a comb at the front of the stripping-cylinder.

2. A seed-gatherer, comprising a movable main frame, a body adapted to rock thereon, a rotatable stripping-cylinder having series of spaced teeth thereon, and a spring-controlled comb at the front of the stripping-cylinder.

3. A seed-gatherer, comprising a wheeled main frame, a body adapted to rock therein, a stripping-cylinder having series of teeth diagonally disposed on the periphery thereof, an upright comb mounted on a cross-bar, said bar being spring-cushioned and adapted to slide on the bottom frame of the body, and an apron adjustable above and forward of the comb.

4. A seed-gatherer, comprising a main frame, a transverse axle, wheels thereon, a body rockable on said axle, a rotatable stripping-cylinder in the body, a slidable spring-cushioned comb on a cross-bar at the front of the stripping-cylinder, an endless apron having spaced ribs thereon and adjustably supported on the body above the comb, an endless apron in the body behind the stripping-cylinder, and means to drive the cylinder and both aprons.

5. A seed-gatherer, comprising a wheeled main frame, a spring-controlled tilting body therein, a rotatable toothed cylinder in the body and a stripping-comb at the front of the body adjacent the cylinder.

6. A seed-gatherer, comprising a wheeled main frame, a spring-controlled tilting body therein, a rotatable toothed cylinder, a stripping-comb adjacent the cylinder, and adjustable means forward of the comb to cause engagement therewith of the grass or grain.

In testimony whereof I affix my signature in presence of two witnesses.

JOSIAH PENCE.

Witnesses:
J. C. SMITHER,
J. W. COOK.